United States Patent Office 3,218,865
Patented Nov. 23, 1965

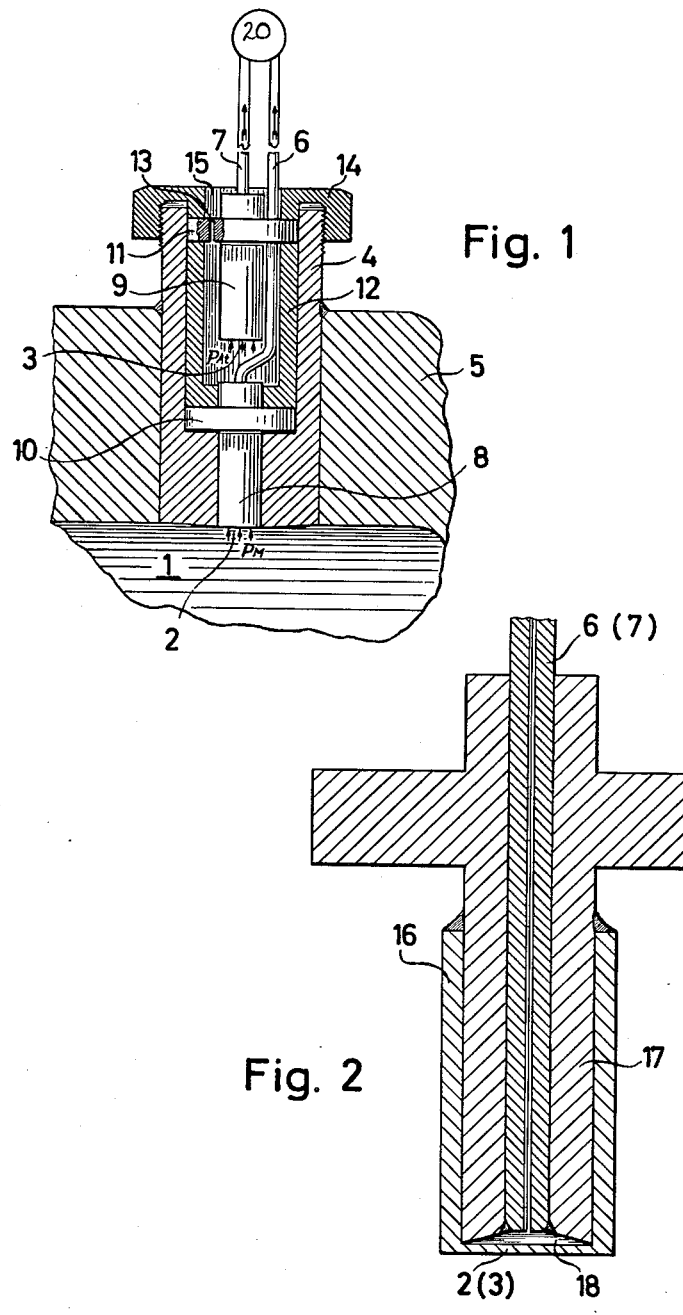

3,218,865
FLUID PRESSURE MEASURING DEVICES
Hans Joachim Zimmer, Falkensteiner Strasse 1,
Kronberg, Taunus, Germany
Filed Dec. 27, 1962, Ser. No. 247,727
Claims priority, application Germany, Dec. 28, 1961,
Z 9,156
3 Claims. (Cl. 73—407)

The invention relates to improvements in fluid pressure measuring devices for use in measuring the pressure of liquid or gaseous media, for example, in pipe lines, and is concerned with such devices in which fluid pressure of changes of fluid pressure are transmitted to an indicating means through a diaphragm.

Pressure measuring instruments are known in various constructional forms. In connection with tanks or containers for example, it is known to use pressure cells in association with pressure gauges or recorders having suitable ranges of pressure. In such a known device, the displacing forces resulting from pressure changes in the medium are transmitted to the gauge through a fluid. It is also known to improve measurement by pressure cells by using electrical data converters, e.g. capacitive or inductive transmitters.

A measuring device in which the pressure to be measured acts directly upon a pressure chamber through narrow pipe lines, is also known. In this case, the pipe lines for transmitting the pressure are filled with the medium whose pressure is to be measured.

Owing to their spatial expanse, the installation of such known pressure measuring instruments is not feasible in certain production plants for chemical processes. Moreover, in connection with chemical installations in which polymerisation or condensation is carried out under high pressure and at high temperature, the pressure measuring instruments must be so designed so as to avoid the formation of dead spaces in the pipe lines. This requirement must be fulfilled particularly where continuous production processes are concerned as any material accumulating in the dead spaces would age and crack.

The use of diaphragms consisting of a resilient metal plate is also known for pressure measurement. Such diaphragms are, however, extraordinarily sensitive to temperature influences.

It is an object of the present invention to provide an improved fluid pressure measuring device in which the effect of temperature or temperature variations is materially reduced if not entirely obviated.

According to the present invention, a fluid pressure measuring device comprises a first diaphragm adapted to be exposed to such fluid pressure and a second diaphragm adapted to be exposed to atmospheric pressure.

According to a preferred embodiment of the invention, a fluid pressure measuring device comprises a first diaphragm adapted to be exposed to such fluid pressure, a second diaphragm adapted to be exposed to atmospheric pressure and heat conducting means connecting said two diaphragms to maintain both diaphragms at substantially the same temperature.

As data for the particular pressure prevailing in the medium, the differential value resulting from the measurement of both diaphragms, is read off.

Desirably, the two diaphragms are arranged directly succeeding each other in the wall of the pipe. This arrangement is particularly of advantage for technical production reasons, since the two diaphragms having a cylindrical housing of relatively small dimensions can be inserted in a cylindrical bore in the wall of the pipe. The consequence is that both diaphragms are under substantially the same temperature influence resulting from the temperature of the medium to be measured. Whilst the diaphragm which is subjected to the pressure of the medium to be measured, is directly under the temperature influence of the latter, the actual prevailing temperature is delivered to the second diaphragm through the conductivity of the pipe wall, for the comparison measurement. Thus the temperature conditions of two diaphragms are compared with each other with sufficient accuracy for the purpose intended.

It is of course also possible to arrange the two diaphragms in direct succession to each other in the wall of the pipe, one of them being in direct contact with the medium to be measured, whilst the second diaphragm loaded with atmospheric pressure is placed inside the wall of the pipe at a slight distance from the medium to be measured.

The diaphragms are appropriately arranged in a circular or oval housing of coherent construction which is inserted in a corresponding bore of the pipe wall. The transmission of the distortion movements of the diaphragm to the indicating system during changes in pressure can be brought about by means of fluid, through a capillary tube. It is however possible to effect the transmission by mechanical means.

In order that the deformations of the diaphragm may be kept within the elastic limit during the loading of same, a stop is appropriately provided for each diaphragm, so that when the loading is excessive, the diaphragm comes into engagement with this stop. Further details and advantages will be apparent from the following description of an embodiment of the invention given by way of example, reference being made to the accompanying drawings in which:

FIG. 1 shows an embodiment of the invention in section and

FIG. 2 shows a detail of the embodiment of FIG. 1 also in section.

The example illustrated in the drawing is concerned with the application of the invention to the measurement of pressure in pipe lines. The device according to the invention is however by no means limited to such a sphere of application but may also be adopted for example for measuring the pressure in tanks or other containers.

According to the invention, the pressure $p_M$ of a medium flowing in a pipe line 1 is ascertained from the indicated difference resulting from two diaphragms 2 and 3. The diaphragms are so arranged with respect to each other that they are subject to identical conditions as regards temperature. In the embodiment shown, the two diaphragms 2 and 3 are arranged in succession to each other radially of the pipe line 1 inside a cylindrical housing 4. This cylindrical housing 4 is inserted in a corresponding bore in the pipe wall 5 and is sealed off against the inner pressure of the pipe line by welding.

The pressure $p_M$ of the medium in the pipe line 1 is transmitted by means of a fluid to an idicating device 20 of suitable known construction, via a capillary tube 6, by the diaphragm 2 which is in direct contact with the medium. The diaphragm 3 which is under the same temperature influence as the diaphragm 2 on account of the thermal conductivity of the pipe wall 5, is loaded by the atmospheric pressure $p_At$. The resulting deformation is also transmitted through a capillary 7 to the indicating device where the actual value for the pressure of the medium can be read off from the difference between the amounts registered by the two diaphragms. The indicating device 20 is responsive to the differences in pressures to which diaphragms 2 and 3 are exposed to derive a measure of the fluid pressure in pipe line 1.

The differential value may be obtained in several ways. One economical way makes use of the so-called "pressure transducer" which is known per se and which acts to convert the mechanical deflection of a diaphragm into an electrical signal. If two transducers are used, one for each diaphragm, the electrical outputs thereof preferably are combined with opposite sign, so that an electrical differential signal is obtained, the magnitude of which is indicative of the actual pressure of the medium concerned. The datum level of this pressure is atmospheric pressure.

The diaphragms 2 and 3 are respectively located at the bottom end of cylindrical elements 8 and 9 which are each formed with an annular flange or shoulder indicated at 10 or 11 respectively. These flanges 10 and 11 have a diameter corresponding substantially to the inner diameter of the cylindrical housing 4. The precise relative position of the cylindrical elements, and therefore of the diaphragm with respect to each other, is determined by a cup-shaped insert 12 in the housing 4, this insert resting against the mutually opposite surfaces of the flanges 10 and 11.

The upper flange 11 is provided with at least two apertures, one of which enables the capillary tube 6 to pass therethrough, whilst the other, indicated at 13, allows the atmospheric pressure to reach the diaphragm 3. At the upper end, the housing 4 is sealed off by a screwed cap 14 having a central cavity 15.

FIG. 2 illustrates an embodiment of a cylindrical element 8 or 9 as the case may be. The diaphragm 2 or 3 forms the bottom of a metallic sleeve 16. Admitted into this sleeve 16 is a solid member 17 whose central, axially running bore forms the capillary tube 6 or 7. The bottom face 18 of the member 17 adjacent the diaphragm 2 or 3, is so shaped that, assuming a flat shape for the diaphragms, it leaves a conical cavity. This cavity like the capillaries, is filled with a suitable fluid such as, for example, mercury. In the case of intense deformation of the diaphragm, the latter comes to rest against the bottom face 18 of the member 17, but the spacing is so proportioned that the deformations of the diaphragm remain within the elastic limit.

The indicating devices to which the deformation effects of the diaphragms are transmitted may be of various types. Thus for example, potentiometers or inductive transmitters may be associated with the diaphragms in order to determine the pressure by an electrical differential measurement. At the two potentiometers, the voltages correlated with temperature are in reciprocal connection so that they mutually cancel each other. The pressure of the medium acting on the diaphragm 2 brings about a voltage differential which can be used, for example, for regulating the rotary speed of a pump.

I claim:

1. A fluid pressure measuring device comprising a substantially tubular element of heat conducting material having a passage therethrough, the passage opening to one end face of said element being of reduced cross-section and the passage opening to the other end face of said element being of enlarged cross-section, a first metallic sleeve extending into the reduced part of said passage towards said one end face of said element, a first diaphragm closing said first sleeve adjacent said one end face of the element, a first capillary tube communicating with that face of said first diaphragm within said first sleeve and extending externally of said element, a first annular shoulder associated with said first sleeve and disposed within the enlarged part of said passage to support and locate said first sleeve, a second metallic sleeve extending into said enlarged part of said passage, a second diaphragm closing the inner end of said second sleeve, a second capillary tube communicating with that face of said second diaphragm within said second sleeve and extending externally of said element, a second annular shoulder associated with said second sleeve and disposed within said enlarged part of said passage to support and locate said second sleeve, said second shoulder being apertured to expose said second diaphragm to the pressure prevailing externally of said element at said other end face thereof, a substantially cylindrical spacer member disposed between said first and second annular shoulders and means engageable with said element and said second annular shoulder to maintain said sleeves in assembled relationship.

2. A fluid pressure measuring device comprising a substantially tubular element of heat conducting material having a passage therethrough which from one end of the element is of one cross-section and for the remainder of its length is of a larger cross-section, an annular shoulder defined in said passage by the transition from the one cross-section to the larger cross-section, a first metallic sleeve extending into said part of said passage of said one cross-section towards the other end of the element, a first diaphragm closing said first sleeve adjacent said other end of the element, a first member extending into said first sleeve towards said first diaphragm and defining with said first diaphragm a first space and further defining a stop limiting deformation of said first diaphragm, a first capillary tube extending from said first space externally of said element, a first annular flange associated with said first sleeve and located within said part of the passage of larger cross-section by said annular shoulder to locate said first sleeve, a second metallic sleeve extending into the part of said passage of said larger cross-section, a second diaphragm closing said second sleeve at the inner end thereof, a second member extending into said second sleeve towards said second diaphragm and defining with said second diaphragm a second space and further defining a stop limiting deformation of said second diaphragm, a second capillary tube extending from said second space externally of said element, a second annular flange associated with said second sleeve and located in said part of the passage of larger cross-section, at least one aperture in said second flange exposing said second diaphragm to the atmospheric pressure prevailing externally of said element, a substantially cylindrical spacer member interposed between said first and second flanges and means engageable with said element and said second flange to retain said first and second flanges in spaced relationship.

3. A fluid pressure measuring device comprising a substantially tubular element of heat conducting material having a passage therethrough, the passage opening to one end face of said element being of reduced cross section and the passage opening to the other end face of said element being of enlarged cross section, a first metallic sleeve extending into the reduced part of said passage towards said one end face of said element, a first diaphragm closing said first sleeve adjacent said one end face of the element, a first capillary tube communicating with that face of said first diaphragm within said first sleeve and extending externally of said element, a first annular shoulder associated with said first sleeve and disposed within the enlarged part of said passage to support and locate said first sleeve, a second metallic sleeve extending into said enlarged part of said passage, a second diaphragm closing the inner end of said second sleeve, a second capillary tube communicating with that face of said second diaphragm within said second sleeve and extending externally of said element, a second annular shoulder associated with said second sleeve and disposed within said enlarged part of said passage to support and locate said second sleeve, said second shoulder being apertured to expose said second diaphragm to the pressure prevailing externally of said element at said other end face thereof, spacer means disposed between said first and second annular shoulders, means for maintaining said first and second sleeves in assembled relationship within said tubular element, said first and second diaphragms being maintained at substantially the same temperature, and means cooperating with said diaphragms and responsive to the difference in pressures to which said first and second diaphragms are exposed to derive a measure of fluid pressure to which one of said diaphragms is exposed.

References Cited by the Examiner

UNITED STATES PATENTS

| | | | |
|---|---|---|---|
| 1,377,220 | 5/1921 | Nye | 73—406 |
| 2,984,109 | 5/1961 | Savage et al. | 73—407 X |
| 3,047,022 | 7/1962 | Aldinger | 73—407 |
| 3,085,437 | 4/1963 | Osterstrom | 73—407 |
| 3,103,811 | 9/1963 | Ayres et al. | 73—152 |
| 3,153,935 | 10/1964 | Karlson | 73—398 |

LOUIS R. PRINCE, *Primary Examiner.*

JOSEPH P. STRIZAK, RICHARD C. QUEISSER,
*Examiners.*